US009410270B2

(12) United States Patent
Sterman et al.

(10) Patent No.: US 9,410,270 B2
(45) Date of Patent: Aug. 9, 2016

(54) THREAD STRUCTURE COMPOSITION AND METHOD OF MAKING

(71) Applicant: NIKE, Inc., Beaverton, OR (US)

(72) Inventors: Yoav Sterman, Portland, OR (US); Todd A. Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 99 days.

(21) Appl. No.: 14/466,319

(22) Filed: Aug. 22, 2014

(65) Prior Publication Data

US 2016/0053410 A1 Feb. 25, 2016

(51) Int. Cl.
*D02G 3/04* (2006.01)
*D03D 25/00* (2006.01)
*D02G 3/40* (2006.01)
*B29C 47/36* (2006.01)
*B29C 47/00* (2006.01)
*B29C 47/10* (2006.01)

(52) U.S. Cl.
CPC ............ *D02G 3/402* (2013.01); *B29C 47/0014* (2013.01); *D02G 3/04* (2013.01); *D02G 3/045* (2013.01); *D03D 25/00* (2013.01); *B29C 47/0002* (2013.01); *B29C 47/1045* (2013.01); *B29C 47/1054* (2013.01); *B29C 47/36* (2013.01)

(58) Field of Classification Search
CPC ............ D02G 3/00; D02G 3/02; D02G 3/04; D02G 3/042; D02G 3/045; D02G 3/18; D02G 3/22; D02G 3/36; D02G 3/38; D02G 3/24; D02G 3/40; D07B 1/005; D07B 1/02; D07B 1/04; D03D 25/00; B29C 47/0014; B29C 47/0002; B29C 47/1045; B29C 47/1054; B29C 47/36
See application file for complete search history.

(56) References Cited

U.S. PATENT DOCUMENTS

| 4,306,410 | A | * | 12/1981 | Nakamura | A63B 51/02 |
| | | | | | 428/377 |
| 6,153,034 | A | | 11/2000 | Lipsker | |
| 6,692,606 | B1 | | 2/2004 | Cederblad et al. | |
| 6,824,717 | B2 | | 11/2004 | Schafer | |
| 2002/0063349 | A1 | | 5/2002 | Edwards et al. | |
| 2004/0103979 | A1 | | 6/2004 | Kramer | |
| 2005/0136758 | A1 | * | 6/2005 | Newton | B29C 70/22 |
| | | | | | 442/43 |
| 2008/0170982 | A1 | * | 7/2008 | Zhang | B82Y 10/00 |
| | | | | | 423/447.3 |

(Continued)

FOREIGN PATENT DOCUMENTS

DE 2212802 10/1972
DE 19624412 A1 1/1998

(Continued)

OTHER PUBLICATIONS

Kalle, P., "Fibre Core" from RepRap Wiki dated Nov. 3, 2014, pp. 1-5—http://reprap.org/wiki/Fibre_Core.
International Search Report and Written Opinion for PCT Application No. PCT/US2015/038591, mailed Dec. 9, 2015.
Hegde; Raghavendra R. et al., "Bicomponent Fibers", Apr. 30, 2004, XP055211613, Retrieved from the Internet: URL:http://www.engr.utk.edu/mse/Textiles/Bicomponent%20fibers.htm [retrieved on Sep. 7, 2015] Section 5.2 with all subsections, in particular 5.2.2.

(Continued)

*Primary Examiner* — Ismael Izaguirre
(74) *Attorney, Agent, or Firm* — Plumsea Law Group, LLC

(57) ABSTRACT

A system, method, and thread structure composition are disclosed. The thread structure composition includes a first thread and a second thread. The second thread includes a heat moldable material that is moldable above a predetermined temperature. The first thread remains in a solid form at temperatures substantially above the predetermined temperature. The second thread is twisted around the first thread.

20 Claims, 16 Drawing Sheets

(56) References Cited

U.S. PATENT DOCUMENTS

2012/0220179 A1 8/2012 Nakase et al.
2012/0298280 A1* 11/2012 Domingo .............. B60C 9/0007
   152/556
2013/0260104 A1 10/2013 Dua et al.
2014/0059896 A1 3/2014 Weidl et al.
2014/0096420 A1 4/2014 Ronner et al.

FOREIGN PATENT DOCUMENTS

JP    03185139         8/1991
WO    2013/022347 A1   2/2013

OTHER PUBLICATIONS

Gebauer; Elke et al., "Paper No. 29 "A new polyester bicomponent fiber that allows a solvent free treating for power transmission belts"", Oct. 2, 1998, XP055211684, Retrieved from the Internet: URL:http://citeseerx.ist.psu.edu/viewdoc/download?doi=10.1.1.399.1623&rep=rep1&type=pdf [retrieved on Sep. 7, 2015] the whole document.
Invitation to Pay Additional Fees, Partial International Search Report dated Sep. 28, 2015 in International Patent Application No. PCT/US2015/038591.

* cited by examiner ic # THREAD STRUCTURE COMPOSITION AND METHOD OF MAKING

BACKGROUND

The present embodiments relate generally to threads and in particular to threads that may be attached to articles.

Various compositions for printing using freeform printers have been proposed. Such compositions are typically configured to be extruded as a liquid. The extruded material may cure, thereby changing into a solid state and bonding with other extruded material.

SUMMARY

In one aspect, a thread structure composition includes a first thread comprising a first material and a second thread comprising a second material that is different from the first material. The second material is moldable above a predetermined temperature. The first material is in a solid state above the predetermined temperature. The second thread is twisted around the first thread.

In another aspect, a method for a thread structure composition includes providing a first thread comprising a first material and providing a second thread comprising a second material that is different from the first material. The second material is moldable above a predetermined temperature. The first material is in a solid state above the predetermined temperature. The method also includes twisting the second thread around the first thread to form the thread structure composition.

In a further aspect, a system includes a thread structure. The thread structure includes a first thread including a first material, the first material having a first melting temperature. The thread structure further includes a second thread including a second material, the second material having a second melting temperature. The second thread is twisted around the first thread. The system further includes a heat source configured to heat the thread structure composition to a temperature. The temperature is less than the first melting temperature. The temperature is greater than the second melting temperature. The system further includes an extruder configured to extrude the heated thread structure composition. The system further includes a fabric for receiving the extruded thread structure composition.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
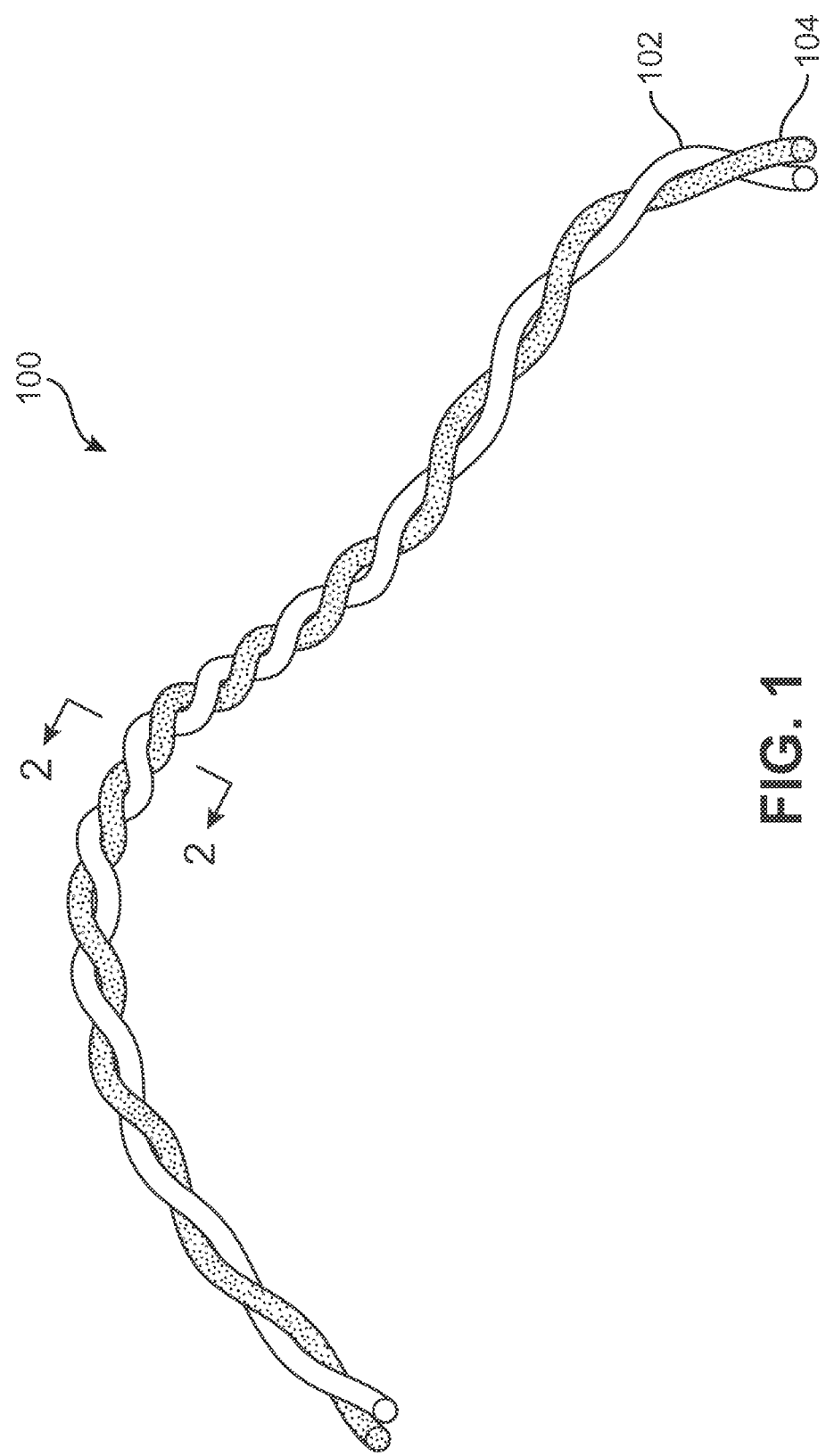
FIG. 1 is a schematic view of a thread structure composition, in accordance with an exemplary embodiment.
Figure 2:
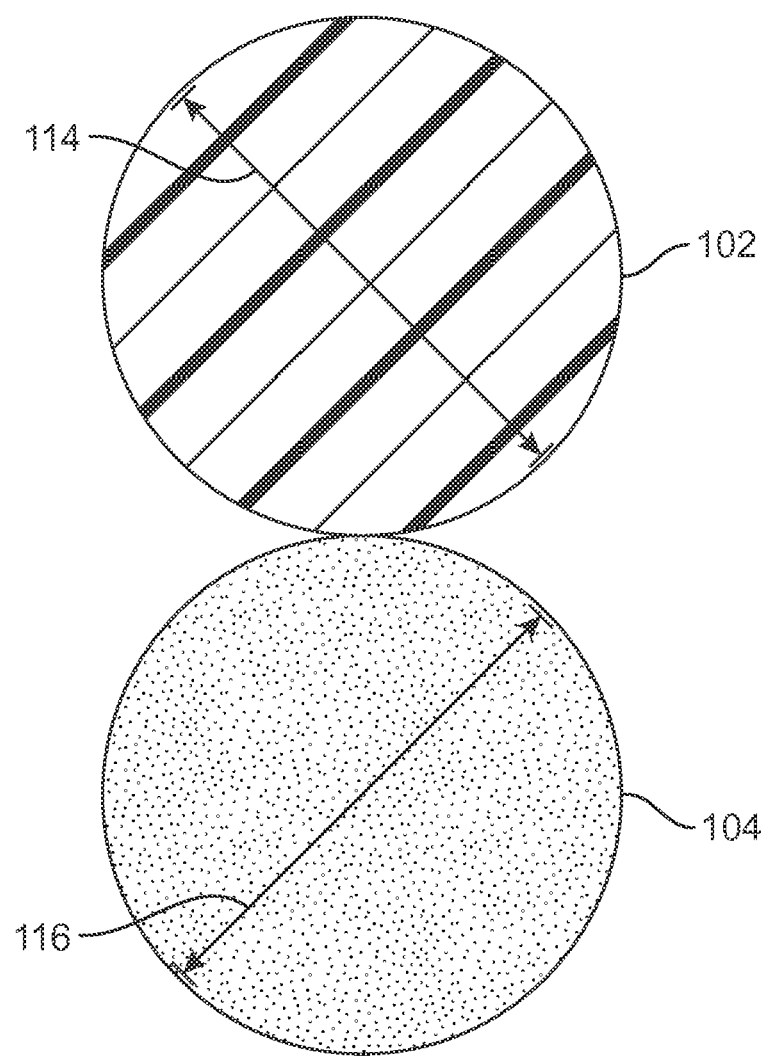
FIG. 2 is a cross-sectional view of the thread structure composition of FIG. 1, in accordance with an exemplary embodiment.

FIGS. 1-2 illustrate a thread structure composition 100. As used throughout this detailed description the term "thread structure composition" refers to any combination of at least two different kinds of threads. Further, as used herein, a thread is any generally elongated structure with a length substantially greater than its diameter. Threads could alternatively be characterized as fibers, yarns, or filaments. As shown in FIG. 1, the thread structure composition 100 includes a first thread 102 and a second thread 104. Moreover, in some cases, first thread 102 and/or second thread 104 could be further comprised of smaller individual fibers that are interlocked to form a larger fiber, thread, or yarn.

In different embodiments, two or more threads can be joined in any manner to form a thread structure composition. In some embodiments, each of the two or more threads of the thread structure composition is exposed. For example, a second thread is twisted around a first thread such that a portion of the first thread is exposed. In various embodiments, one thread may be twisted around another thread. In other embodiments, two threads could be twisted around one another to form a double helix pattern. In the exemplary embodiment shown in FIG. 1, first thread 102 and second thread 104 are twisted around one another so as to form a double helix pattern.

Figure 10:
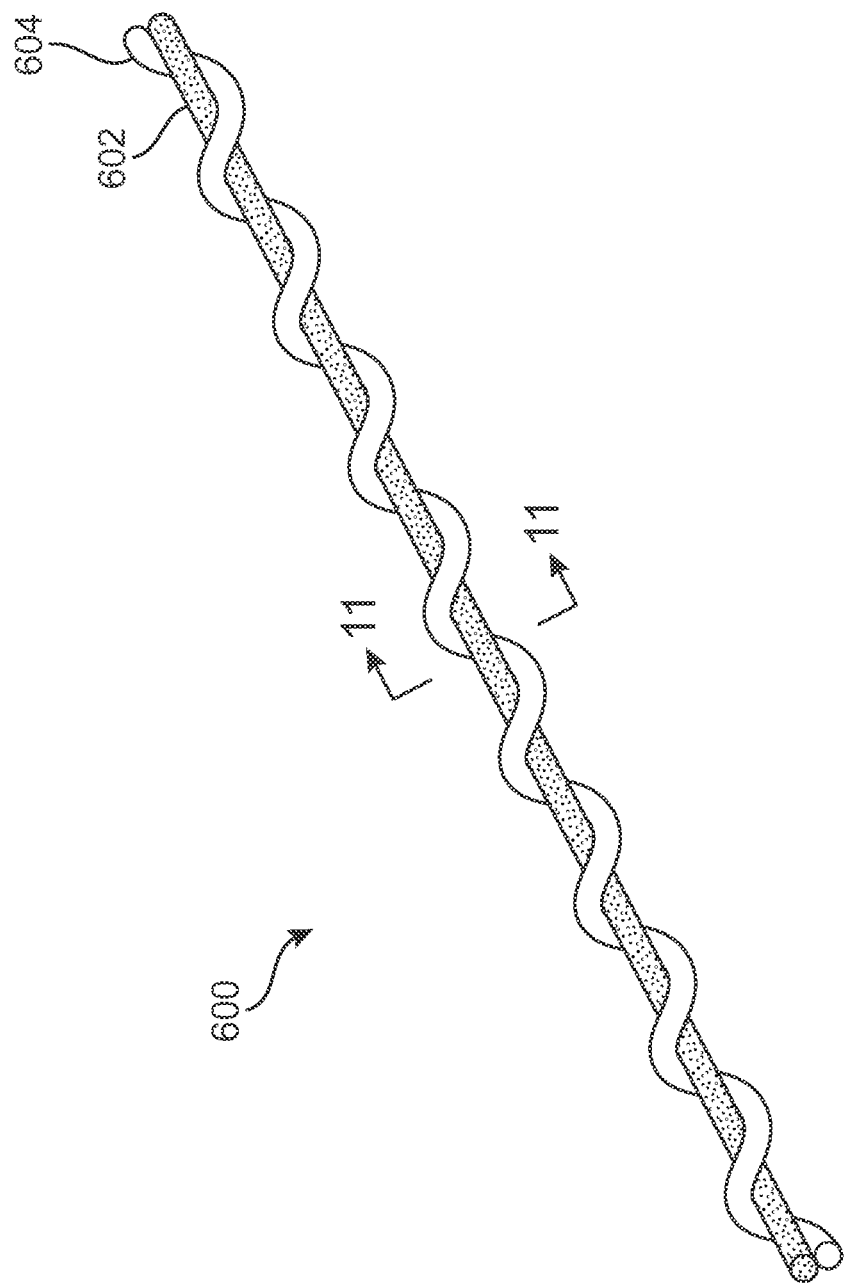
FIG. 10 is a schematic view of a straight thread structure composition, in accordance with an exemplary embodiment.

In another example, illustrated in FIG. 10, a second thread may be wound helically around a first thread that remains approximately straight. Alternatively, in still other embodiments, two or more threads of a thread structure composition could be twisted, braided, woven, or otherwise combined using any methods known in the art for combining threads, yarns, fibers and/or filaments into a composite structure.

In different embodiments, the diameters of two threads could vary in any manner. In some embodiments, the diameters of the two threads could be different. In one embodiment, the first thread has a first diameter substantially equal to a second diameter of the second thread. For example, as shown in FIG. 2, the first diameter 114 of the first thread 102 is substantially equal to the second diameter 116 of the second thread 104. As used herein, the term substantially equal means that the two quantities do not differ by more than a predetermined tolerance. Moreover, the predetermined tolerance may be characterized as a relative difference or percent difference. For example, the first diameter 114 may be substantially equal to the second diameter 116 whenever the first diameter 114 is within twenty percent of the second diameter 116. As another example, the first diameter 114 may be substantially equal to the second diameter 116 whenever the first diameter 114 is within ten percent of the second diameter 116.

First thread 102 and/or the second thread 104 may be made from a variety of different materials. Exemplary materials that could be used include materials associated with threads, yarns and strings used in forming textiles. These threads and yarns are generally comprised of fibers made from materials including, but not limited to: wool, flax, and cotton, as well as other one-dimensional materials. The thread may be formed using various sources of thread material. Such sources may include animal, plant, mineral, and synthetic sources. Animal material may include, for example, hair, animal fur, animal skin, silk, etc. Plant material may include, for example, grass, rush, hemp, sisal, etc. Mineral material may include, for example, basalt fiber, glass fiber, metal fiber, etc. Synthetic threads may include, for example, polyester, aramid, acrylic, carbon fiber, etc.

In other embodiments, the first thread 102 and/or the second thread 104 may be made from a metal. Exemplary metals that could be used include, for example, aluminum, copper, silver, gold, iron, bronze, titanium, magnesium, steel, stainless steel, chromium, nickel, and the like.

In some embodiments, the first thread 102 and/or the second thread 104 may include a heat moldable material (or heat pliable material). As used herein, a heat moldable material is any material that is substantially moldable (or pliable) above a predetermined temperature, such as a glass-transition temperature and/or a melting temperature. In one embodiment, a heat moldable material has one or more thermal properties such as a glass-liquid transition ("glass transition") temperature and/or a melting temperature. For example, the heat moldable material may be a thermoplastic material having a glass transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (TEFLON), and the like.

In various embodiments, a heat moldable material has a melting temperature within a particular temperature range. For example, a heat moldable material may be a material that has a melting temperature of less than 500 C°. In yet another example, a heat moldable material may be a material that has a melting temperature of less than 300 C°. In a further example, a heat moldable material may be a material that has a melting temperature of less than 230 C°. In one example, a heat moldable material may be a material that has a melting temperature of between 110 C° and 200 C°. In one embodiment, a heat moldable material may be a material that has a melting temperature of less than an extrusion temperature of a printer. For example, a heat moldable material may be a material that has a melting temperature of less than an extrusion temperature of 215 C°. In another example, a heat moldable material may be a material that has a melting temperature of less than an extrusion temperature of 210 C°.

In some embodiments, it is desirable for at least one thread of the thread structure composition to remain in a solid state during a heating and printing step (see FIGS. 5-9). Accordingly, in some embodiments, the thread structure includes at least one thread formed of a melt resistant material. As used herein, the term "melt resistant material" refers to any material without a melting temperature (e.g., a material that combusts above a predetermined temperature such as an paper) or any material with a melting temperature well above a predetermined threshold temperature (e.g., most metals which have a melting temperature significantly above a threshold temperature of about 500 C°). In one embodiment, a melt resistant material has no glass transition temperature. One exemplary melt resistant material is cotton, which may not have a melting temperature. In another example, the melt resistant material could be copper, which has a melting temperature of approximately 1083 C°. In this case, although copper has a melting temperature, the melting temperature may generally be well outside the possible operating temperatures of any heating element in a three-dimensional printer and as such copper may be considered as melt resistant outside of a normal operating range of temperatures (e.g., the normal operating range of temperatures encountered within a three-dimensional printing system).

Melt resistant materials may be formed of various materials. In one embodiment, melt resistant materials include materials that are associated with threads, yarns and strings used in forming textiles. For example, as noted above, the melt resistant material may be cotton. Additionally exemplary materials of melt resistant materials may include wool, flax, and cotton, as well as other one-dimensional materials. Melt resistant materials may be formed using various sources of thread material. Such sources may include animal, plant, mineral, and synthetic sources. Animal material may include, for example, hair, animal fur, animal skin, silk, etc. Plant material may include, for example, grass, rush, hemp, sisal, etc. Mineral material may include, for example, basalt fiber, glass fiber, metal fiber, etc. Synthetic threads may include, for example, polyester, aramid, acrylic, carbon fiber, etc.

In some embodiments, melt resistant materials include metals. Exemplary metals that could be used include, for example, aluminum, copper, silver, gold, iron, bronze, titanium, magnesium, steel, stainless steel, chromium, nickel, and the like.

In one embodiment, melt resistant materials include plastic. In some embodiments, melt resistant materials include thermosetting plastics. In other embodiments, melt resistant materials include high temperature thermoplastics. As used herein, a high temperature thermoplastic has a melting point that exceeds, for example, 500 C°. In another example, a high temperature thermoplastic has a melting point that exceeds, for example, 700 C°. In yet another example, a high temperature thermoplastic has a melting point that exceeds, for example, 1000 C°. In certain embodiments, melt resistant materials have a melting temperature that is greater than a temperature characteristic of heat moldable materials. For example, the melt resistant material may have a melting temperature that is greater than a melting temperature of the heat moldable material. In other embodiments, melt resistant materials have a glass transition temperature that is greater than a temperature characteristic of heat moldable materials. For example, the melt resistant material may have a glass transition temperature that is greater than a melting temperature of the heat moldable material. Alternatively, the melt resistant material may not have a glass transition temperature.

In various embodiments, a melt resistant material has a melting temperature within a particular temperature range. For example, a melt resistant material may be a material that has a melting temperature of greater than 1,000 C°. In another example, a melt resistant material may be a material that has a melting temperature of more than 500 C°. In yet another example, a melt resistant material may be a material that has a melting temperature of greater than 300 C°. In a further example, a melt resistant material may be a material that has a melting temperature of more than 230 C°. In one embodiment, a melt resistant material may be a material that has a melting temperature substantially greater than an extrusion temperature of a printer. For example, a melt resistant material may be a material that has a melting temperature greater than an extrusion temperature of 215 C°.

In some embodiments, the first thread has a higher melting temperature than the second thread. For example, the first thread 102 may have a higher melting temperature than a second thread 104. In some embodiments, the first thread 102 is formed of a melt resistant material. For example, the first thread 102 may be formed of a melt resistant material and the second thread 104 may be substantially formed of the heat moldable material. In the example, the first thread 102 has a higher melting temperature than the second thread 104. As such, the first thread 102 may remain in a solid state while the second thread 104 is being heated to a liquid state. Alternatively, first thread 102 may not having a melting temperature but may generally remain in a solid form at temperatures well above the melting temperature of second thread 104. Accordingly, the first thread 102 may be extruded as a solid during a heating and printing step. Moreover, in some embodiments, the second thread 104 may be extruded as a liquid to bond with the first thread 102 during the heating and printing step.

In various embodiments, the second thread 104 is substantially formed of thermoplastic. For example, as shown in FIG. 2, the second thread 104 may be formed entirely of thermoplastic. In other embodiments, the second thread 104 is formed of thermoplastic and of another material. As used herein, substantially formed of thermoplastic may include the second thread 104 being formed of between seventy percent and one-hundred percent thermoplastic. For example, substantially formed of thermoplastic may include the second thread 104 being formed of at least 70 percent thermoplastic. In another example, substantially formed of thermoplastic may include the second thread 104 being formed of at least 80 percent thermoplastic. In yet another example, substantially formed of thermoplastic may include the second thread 104 being formed of at least 90 percent thermoplastic. In a further example, substantially formed of thermoplastic may include the second thread 104 being formed of at least 95 percent thermoplastic. In one example, substantially formed of thermoplastic may include the second thread 104 being formed of at least 99 percent thermoplastic.

Figure 3:
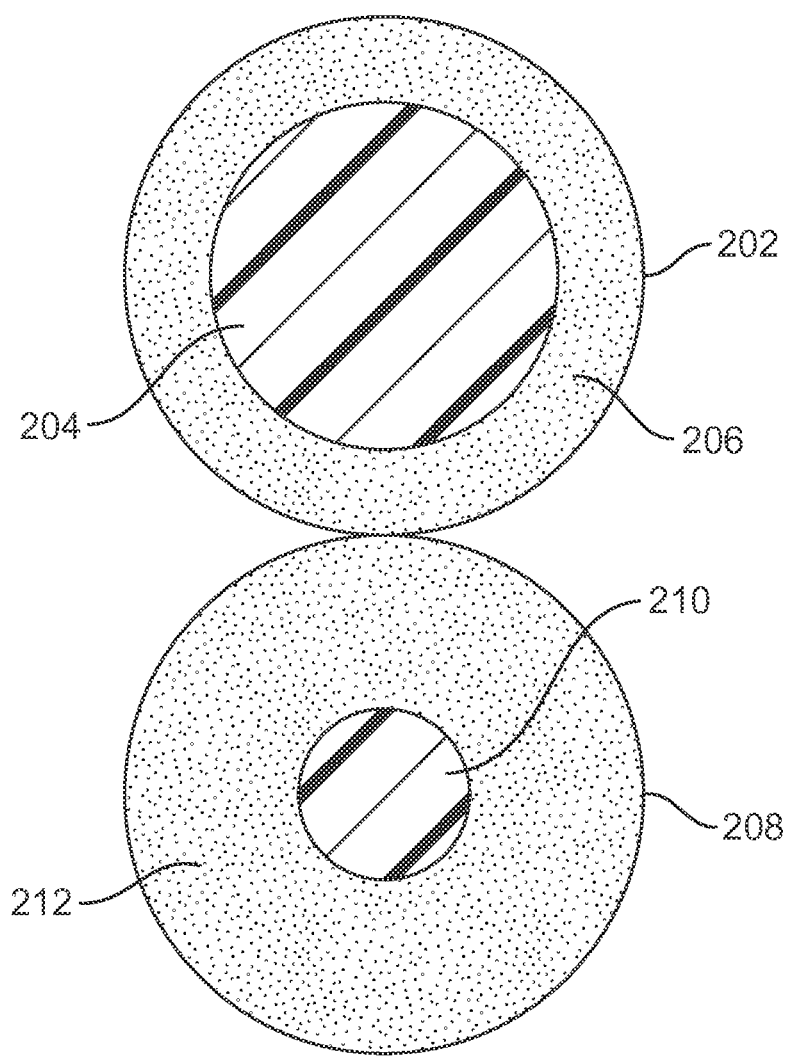
FIG. 3 is a cross-sectional view of a thread structure composition, in accordance with an exemplary embodiment.

In some embodiments, it may be desirable for the first thread to include a core layer and an outer layer to improve a bonding function of the first thread. For example, as shown in FIG. 3, the first thread 202 includes a core layer 204 and an outer layer 206. The outer layer 206 may be substantially formed of a heat moldable material. For example, the outer layer 206 may be formed of thermoplastic. In some embodiments, the core layer 204 is substantially formed of a melt resistant material. For example, the core layer 204 may be formed of cotton. In one embodiment, the first thread 202 may include an outer layer 206 substantially formed of a thermoplastic to improve a bonding function of the first thread 202.

In some instances, it may be desirable for the second thread to include a core layer and an outer layer. For example, as shown in FIG. 3, the second thread 208 includes a core layer 210 and an outer layer 212. The outer layer 212 may be substantially formed of a heat moldable material. For example, the outer layer 212 may be formed of thermoplastic. In some embodiments, the core layer 210 is substantially formed of a melt resistant material. For example, the core layer 210 may be formed of cotton.

Figure 4:
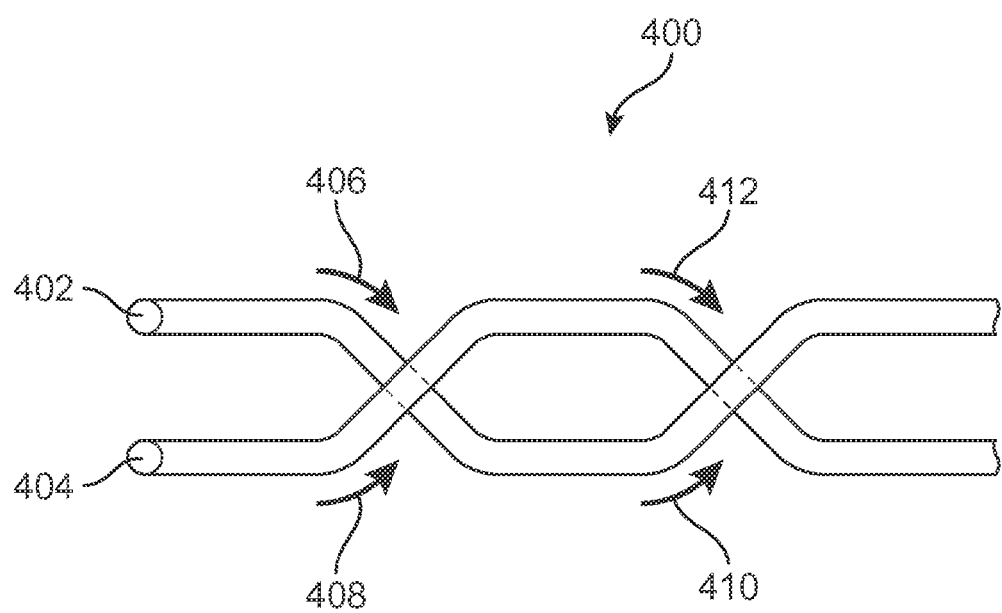
FIG. 4 is a schematic view of a process of twisting threads to make a thread structure composition, in accordance with an exemplary embodiment.

FIG. 4 illustrates a method of making a thread structure composition. For example, a first thread 402 is provided and the second thread 404 is provided. For example, the first thread 402 may be provided by pulling the first thread 402 from a reel (not shown) and the second thread 404 may be provided by pulling the second thread 404 from a reel (not shown).

In some embodiments, first thread 402 could be formed of only a melt resistant material, similar to first thread 102 shown in FIG. 2. In other embodiments, first thread 402 could be formed of core layer and a distinct outer layer, similar to first thread 202 shown in FIG. 3.

In some embodiments, second thread 404 could be formed of only a heat moldable material, similar to the second thread 104 shown in FIG. 2. For example, the second thread 404 may be formed of a thermoplastic. In other embodiments, the second thread 404 could be formed of a core layer and a distinct outer layer, similar to the second thread 208 shown in FIG. 3.

As shown in FIG. 4, the method 400 further includes twisting the second thread 404 around the first thread 402. For example, an upward twisting force 408 is used to wrap the second thread 404 around the first thread 402. Additionally, a downward twisting force 412 may be utilized to further wrap the second thread 404 around the first thread 402. As shown, in some embodiments, the twisting of the second thread 404 around the first thread 402 results in a portion of the first thread 402 being exposed. Moreover, in one embodiment, the twisting of the second thread 404 around the first thread 402 results in a portion of the first thread 402 being exposed and a portion of the second thread 404 being exposed.

In some instances, the method 400 includes twisting the first thread 402 around the second thread 404. For example, a downward twisting force 406 is used to wrap the first thread 402 around the second thread 404. Additionally, an upward twisting force 410 may be utilized to further wrap the first thread 402 around the second thread 404.

In one embodiment, the method includes simultaneously twisting the first thread and the second thread around one another. For example, the method 400 includes simultaneously twisting the first thread 402 and the second thread 404 around one another.

Figure 5:
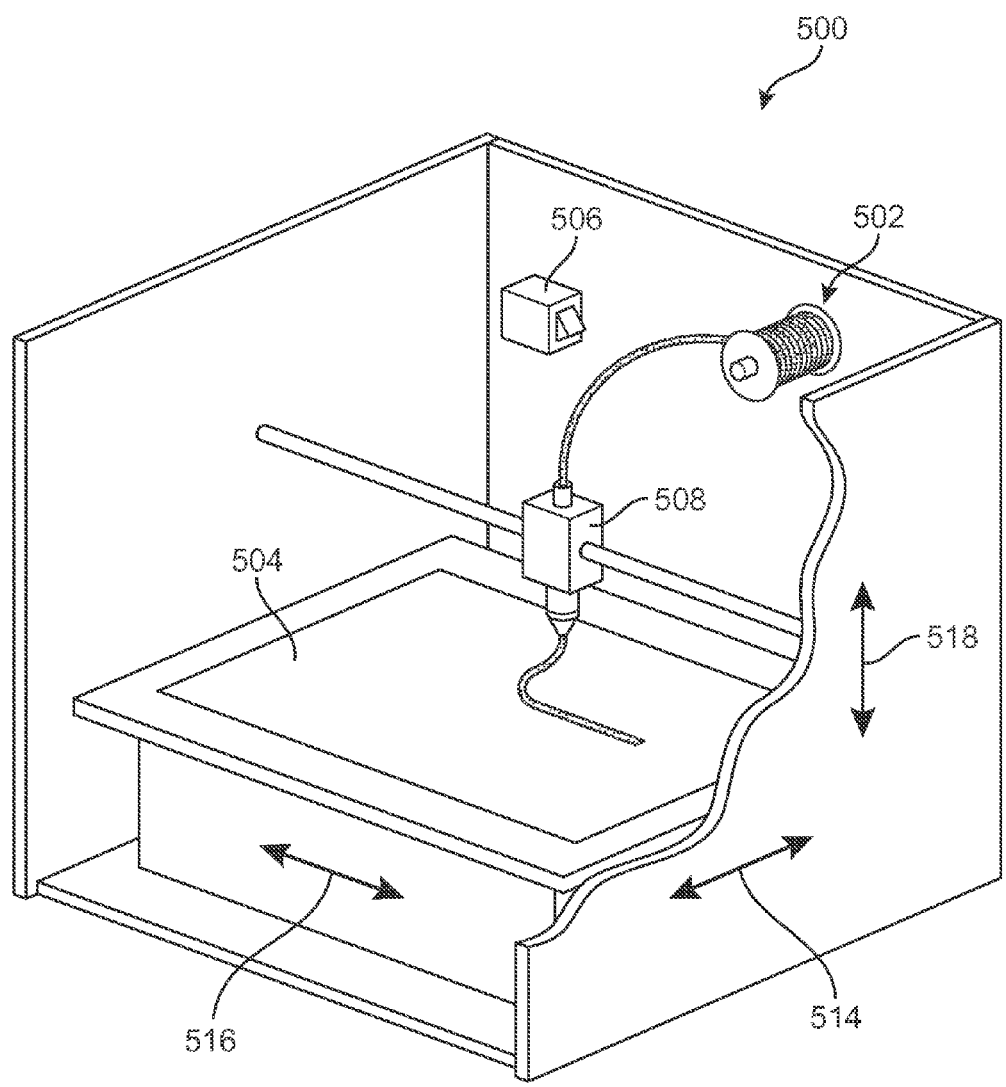
FIG. 5 is a schematic view of a freeform printer configured to print a thread structure composition, in accordance with an exemplary embodiment.

FIGS. 5-9 illustrate a system using a thread structure composition. As shown in FIG. 5, a system 500 may include a thread structure composition 502, a fabric 504, a heat source 506, and an extruder 508. In some embodiments, the system 500 is a freeform printer.

In some embodiments, the thread structure composition includes a first thread and a second thread. For example, the thread structure composition 502 includes a first thread 510 and a second thread 512 (see FIG. 6).

In certain embodiments, the first thread 510 has one or more of the features of first thread 102 and/or the first thread

202. For example, in certain embodiments, first thread 510 may be at least partially formed of a melt resistant material. In one embodiment, the second thread 512 has one or more of the features of the second thread 104 and/or the second thread 208. In certain embodiments, second thread 512 may be at least partially formed of a heat moldable material. For example, second thread 512 may be at least partially formed of thermoplastic material. In some instances, the thread structure composition 502 may be formed using one or more steps of the method described with respect to FIG. 4. For example, in certain embodiments, the second thread 512 is twisted around the first thread 510.

In some instances, it is desirable to print directly onto a fabric. Such a fabric may be formed of, for example, yarns, strings, wool, flax, and cotton, as well as other one-dimensional materials. The fabric may be formed using various sources of material. Such sources may include animal, plant, mineral, and synthetic. Animal material may include, for example, hair, animal fur, animal skin, silk, etc. Plant material may include, for example, grass, rush, hemp, sisal, etc. Mineral material may include, for example, basalt fiber, glass fiber, metal fiber, etc. Synthetic threads may include, for example, polyester, nylon, aramid, acrylic, carbon fiber, etc.

As shown in FIG. 5, the heat source 506 may be configured to heat the thread structure composition. For example, the heat source 506 may be an electric heater element configured to direct heat onto the thread structure composition 502. In some embodiments, the heat source may directly heat the thread structure composition. For example, the heat source 506 emits thermal radiation directly onto the thread structure composition 502. In other embodiments, the heat source indirectly transfers heat to a thread structure composition. For example, the heat source 506 heats a material that conducts the heat to the thread structure composition 502.

In different embodiments, the heat source may be configured to heat the thread structure composition to a temperature associated with the heat moldable material. For example, the heat source 506 may be configured to heat the thread structure composition 502 to a temperature exceeding a glass transition temperature of the heat moldable material. In yet another example, the heat source 506 may be configured to heat the thread structure composition 502 to a temperature exceeding a melting temperature of the heat moldable material.

In various embodiments, the heat source may be configured to heat the thread structure composition to exceed a melting temperature of the heat moldable material and to be less than a characteristics temperature of the melt resistant material. For example, the heat source 506 may be configured to heat the thread structure composition 502 to a temperature exceeding a melting temperature of the heat moldable material and to a temperature below a melting temperature of the melt resistant material. In yet another example, the heat source 506 may be configured to heat the thread structure composition 502 to a temperature exceeding a melting temperature of the heat moldable material and to a temperature below a glass transition temperature of the melt resistant material. In one example, the heat source 506 may be configured to heat the thread structure composition 502 to a temperature exceeding a melting temperature of the heat moldable material and to a temperature below an autoignition temperature of the melt resistant material.

In some embodiments, the heat source may be configured to heat the thread structure composition to exceed a glass transition temperature of the heat moldable material and to be less than a temperature of the melt resistant material. For example, the heat source 506 may be configured to heat the thread structure composition 502 to a temperature exceeding a glass transition temperature of the heat moldable material and to a temperature below a melting temperature of the melt resistant material. In yet another example, the heat source 506 may be configured to heat the thread structure composition 502 to a temperature exceeding a glass transition temperature of the heat moldable material and to a temperature below a glass transition temperature of the melt resistant material. In one example, the heat source 506 may be configured to heat the thread structure composition 502 to a temperature exceeding a glass transition temperature of the heat moldable material and to a temperature below an autoignition temperature of the melt resistant material.

As illustrated in FIG. 5, the extruder 508 may be configured to extrude the heated thread structure composition. For example, the extruder 508 may receive the heated thread structure composition 520 (see FIG. 6) and discharge the heated thread structure composition 520. In one embodiment, the extruder actively discharges the heated thread structure composition. For example, the extruder 508 may generate a pressure difference, thereby generating a force to discharge the heated thread structure composition 520. In other embodiments, the extruder passively discharges the heated thread structure composition. For example, the extruder 508 may be configured to allow a pulling force to pull the heated thread structure through the extruder 508.

In some embodiments, it is desirable to print in multiple directions. In some embodiments, the extruder 508 is configured to move in a first direction 514. In the particular configuration shown in FIG. 5, the first direction 514 may extend along a length of the fabric 504. In one embodiment, the extruder 508 is configured to move in a second direction 516. In the particular configuration shown in FIG. 5, the second direction 516 may extend along a width of the fabric 504. More generally, the first direction 514 and the second direction 516 may be perpendicular to one another and may extend within a plane that is approximately parallel with a printing surface of system 500 (and, accordingly, fabric 504 that is disposed on the printing surface). In various embodiments, the extruder 508 is configured to move in a third direction 518. As shown in FIG. 5, the third direction 518 may generally be perpendicular to the first direction 514 and the second direction 516. In the particular configuration shown in FIG. 5, the third direction 518 may extend along a thickness of the fabric 504. Although particular directions are shown in FIG. 5, it will be understood that extruder 508 may generally move in any three perpendicular directions, two of which may be approximately parallel with a surface of fabric 504 and one of which may be approximately perpendicular to the surface of fabric 504.

Generally, an actuating system may be configured to move extruder 508 in one or more directions. For purposes of illustration, an actuating system is not shown in the figures, however in various embodiments any kind of actuating system known in the art for moving extruders (e.g., extruding nozzles) or other kinds of print heads could be used.

Figure 6:
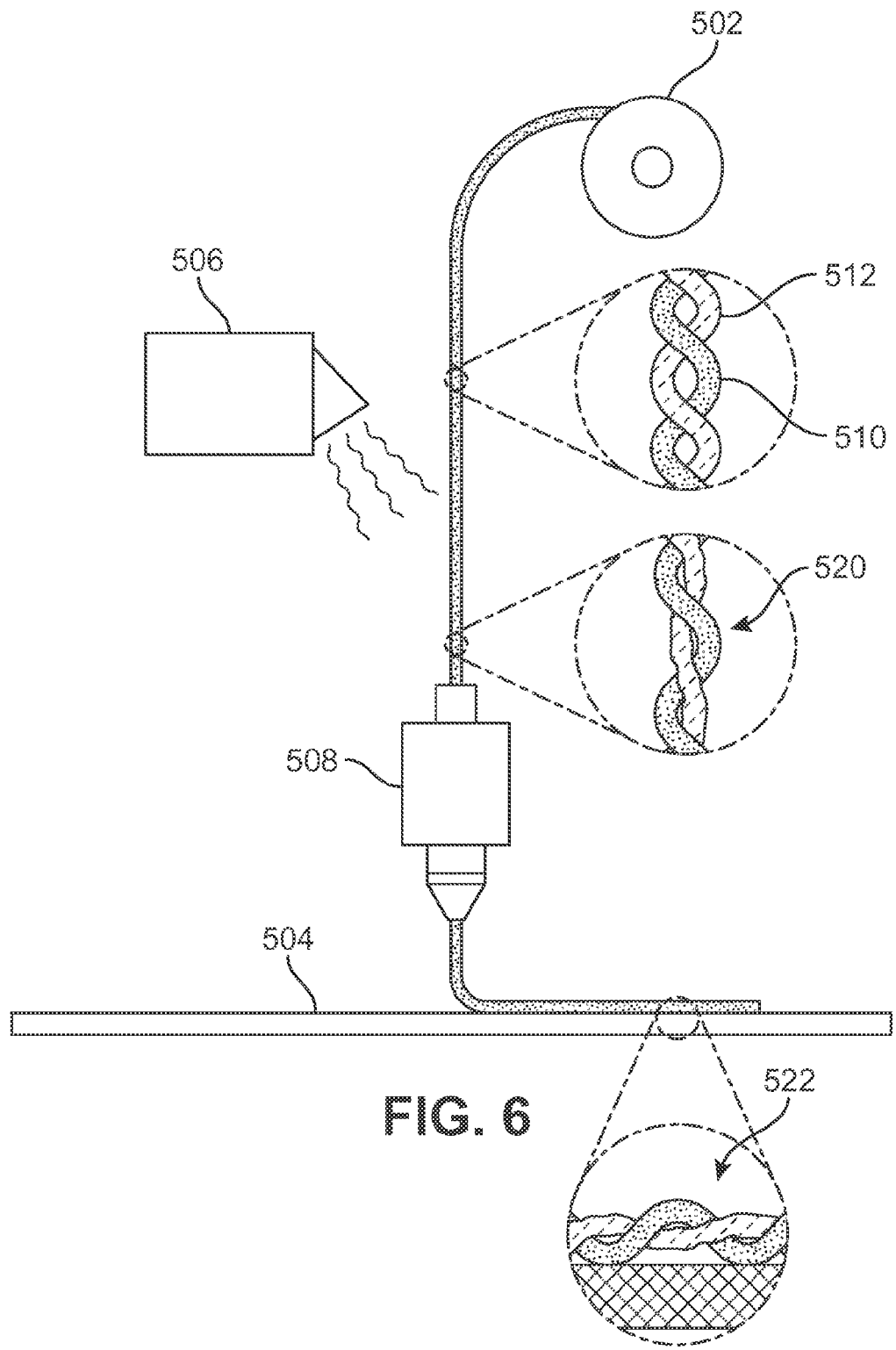
FIG. 6 is a schematic view of a freeform printer during a printing step, in accordance with an exemplary embodiment.
Figure 7:
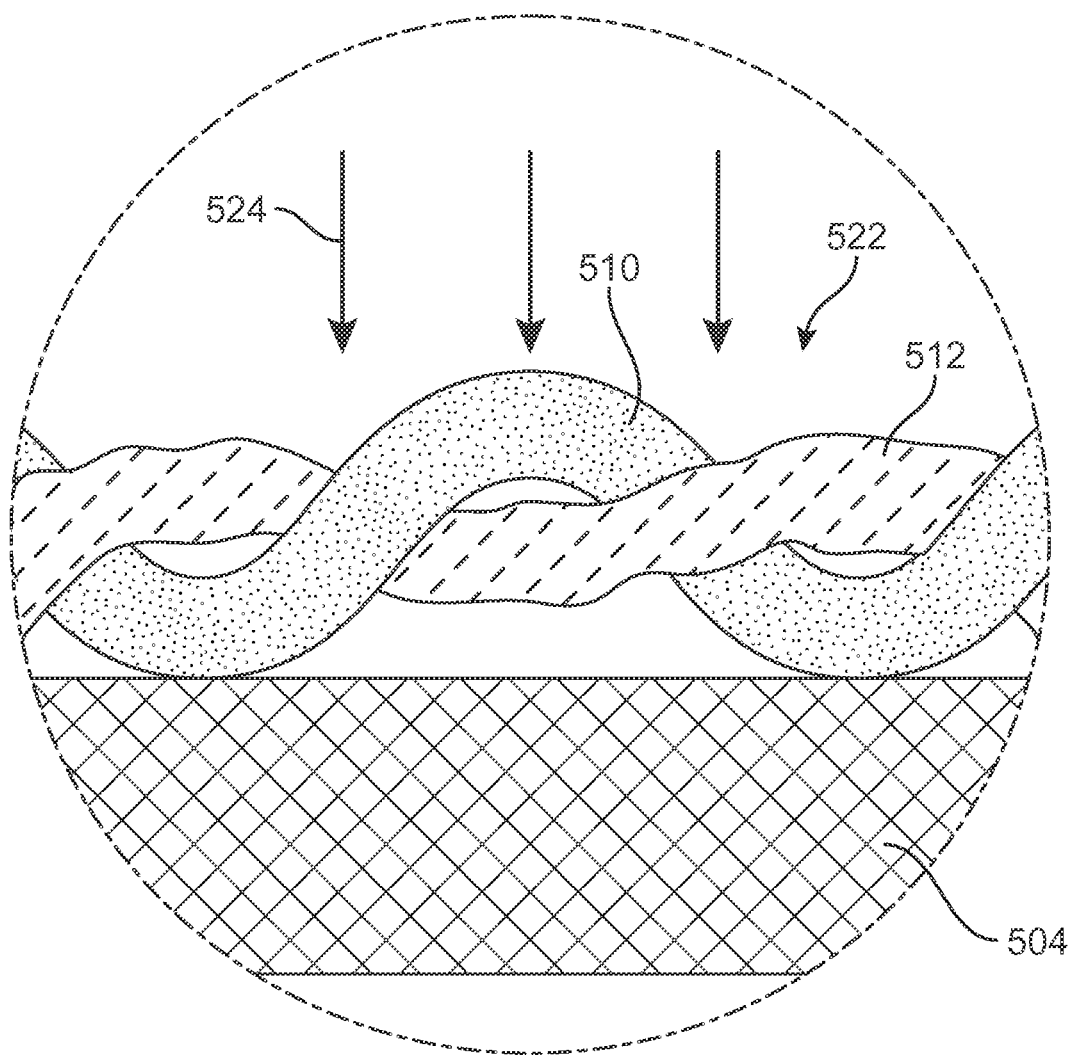
FIG. 7 is a schematic view of a thread structure composition after printing, in accordance with an exemplary embodiment.
Figure 8:
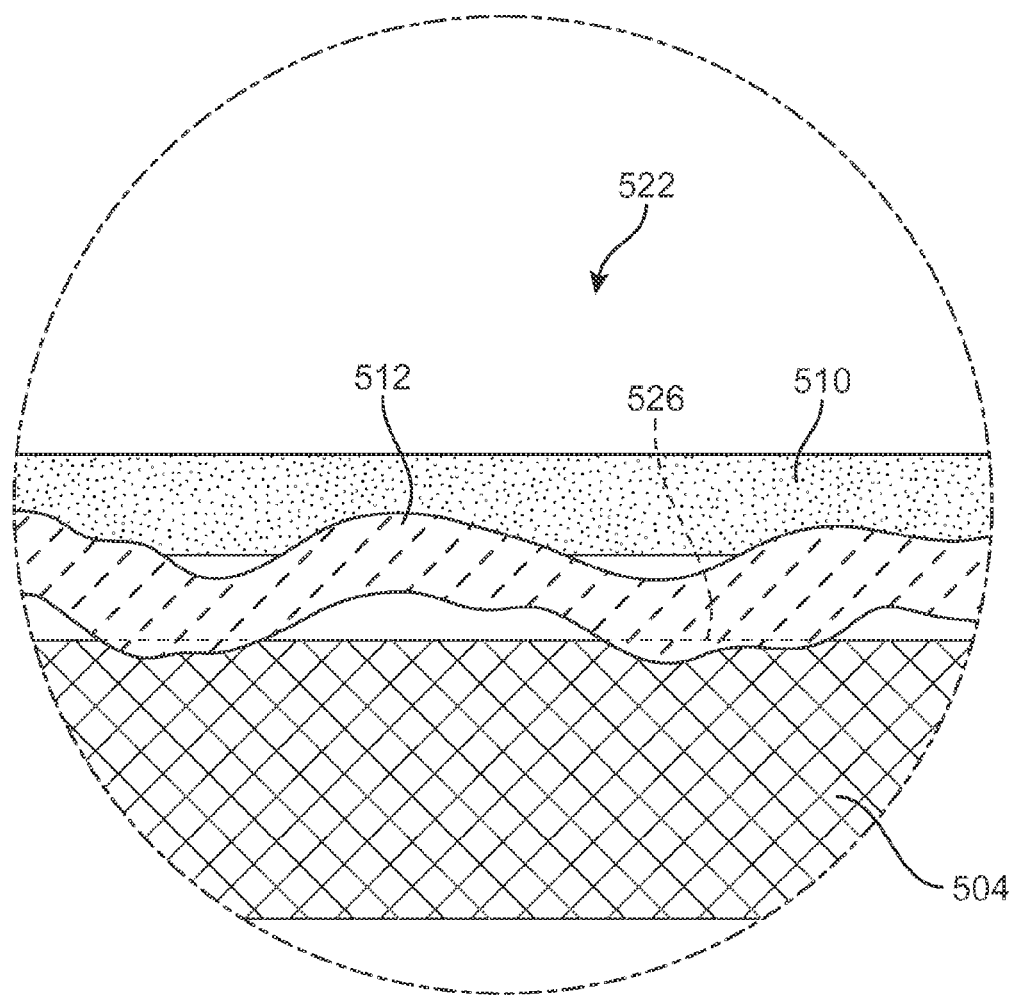
FIG. 8 is a schematic view of a thread structure composition during a bonding step, in accordance with an exemplary embodiment.
Figure 9:
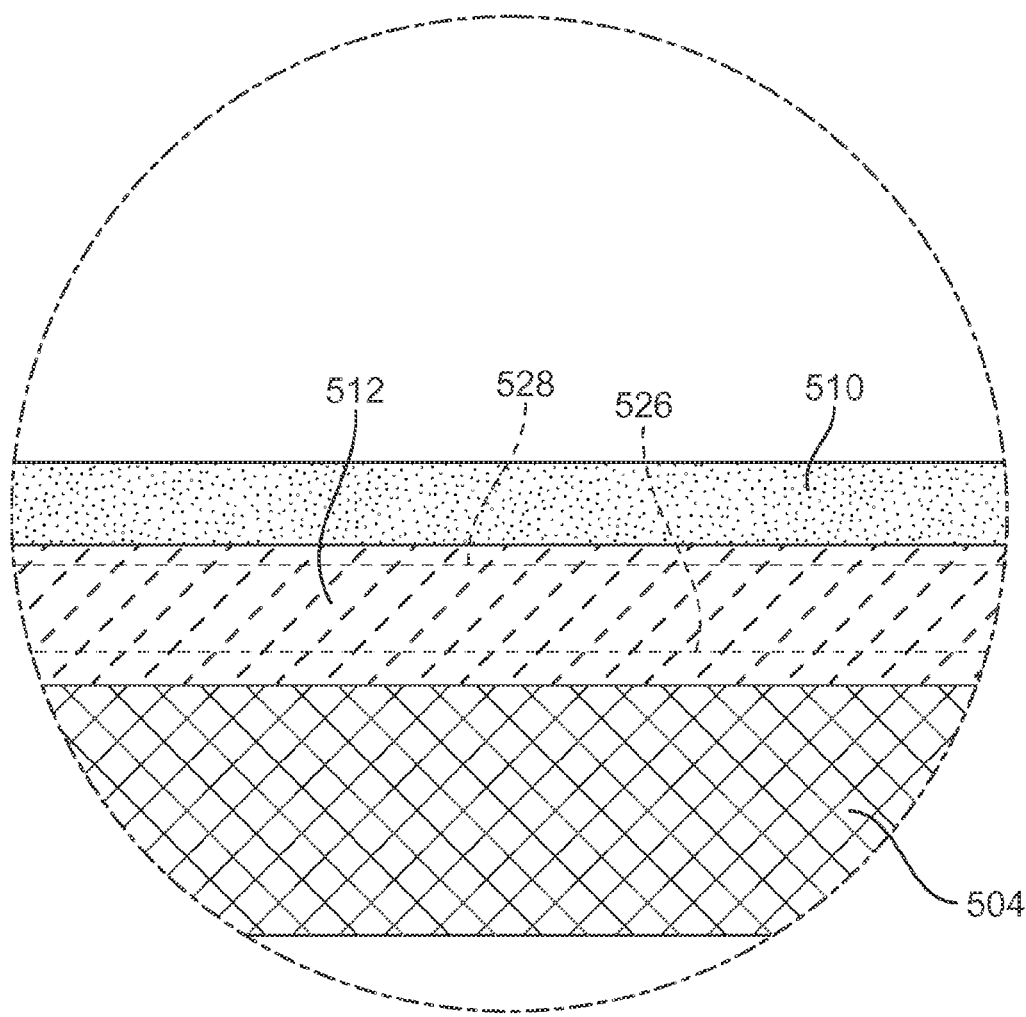
FIG. 9 is a schematic view of a thread structure composition after a bonding step, in accordance with an exemplary embodiment.

As shown in FIG. 6, the heat source 506 heats the thread structure composition 502 and the extruder 508 extrudes the heated thread structure composition 520. In some embodiments, an extruded thread structure includes a first thread and a second thread. For example, as shown in FIGS. 7-9, the extruded thread structure 522 includes the first thread 510 and the second thread 512.

In some cases, heated thread structure composition 520 maintains a thread-like geometry as it is extruded from extruder 508. For example, as shown in FIG. 6, the heated thread structure composition 520 includes a melt resistant material having an elongated shape. As previously noted, an elongated shape has a length that is substantially greater than a width and a thickness. For example, the heated thread structure composition 520 includes a cotton thread having an elongated shape. In various embodiments, the heated thread structure composition 520 includes a melt resistant material in a solid state.

In one embodiment, it is desirable to bond a heat moldable material of the thread structure into the fabric. For example, as shown in FIG. 7, a downward force 524 may be applied to push the extruded heat moldable material of the thread structure 522 into the fabric 504. Such a downward force may be generated by various means. For example, an actuator system may move the extruder 508 into the fabric 504 to generate the downward force 524.

In some embodiments, a heat moldable material of the second thread permeates into a fabric. For example, as shown in FIG. 8, the second thread 512 (which may include a melted thermoplastic) extends through an upper surface 526 of the fabric 504. In other embodiments, a heat moldable material of the second thread bonds onto a fabric. For example, a thermoplastic of the second thread 512 bonds directly onto the upper surface 526 of the fabric 504 (not shown).

In some instances, it is desirable to bond the first thread to a heat moldable material of the thread structure. In some embodiments, a heat moldable material of the second thread permeates through an outer surface of the first thread. For example, as shown in FIG. 9, a thermoplastic of the second thread 512 permeates through an outer surface 528 of the first thread 510. In other embodiments, a heat moldable material of the second thread bonds directly onto an outer surface of the first thread. For example, a thermoplastic of the second thread 512 bonds directly onto the outer surface 528 of the first thread 510 (not shown).

For purposes of illustration, the embodiments of 7-9 illustrate the second thread 512 forming a melted layer of material between the first thread 510 and the fabric 504 to bond the first thread 510 to the fabric 504. Alternatively, however, the second thread 512 may be dispersed in a less uniform manner. Moreover, in some cases, the melted material formed from the second thread 512 could partially, or completely, encompass the first thread 510 as the first thread 510 is pushed down against fabric 504.

In some embodiments, it is desirable for at least one thread of a thread composition structure to remain approximately straight. FIGS. 10-16 illustrate a straight thread composition structure. As shown in FIG. 10, the straight thread structure composition 600 includes a first thread 602 and a second thread 604.

In some embodiments, the second thread 604 has one or more of the features of the second thread 104 and/or the second thread 208. In particular, in certain embodiments, second thread 604 may be at least partially comprised of a heat moldable material. For example, the second thread 604 may be substantially similar to the second thread 104. In another example, the second thread 604 is substantially similar to the second thread 208. In other embodiments, the second thread 604 may be different than the second thread 104 and the second thread 208.

In some instances, it is desirable for at least one thread of the straight thread structure composition to remain in a solid state during a heating and printing step (see FIGS. 13-16). As such, in some embodiments, the first thread has at least one fiber formed of a melt resistant material having a higher melting temperature than the second thread. For example, the first thread 602 may include a thread formed of a melt resistant material have a higher melting temperature than a heat moldable material of the second thread 604. In some embodiments, the first thread 602 is formed of a metal. For example, the first thread 602 may contain a melt resistant material and the second thread 604 may be substantially formed of the heat moldable material. In the example, the melt resistant material has a higher melting temperature than the heat moldable material. As such, the melt resistant material may remain in a solid state while the heat moldable material is being heated to a liquid state. Accordingly, the melt resistant material may be extruded as a solid during a heating and printing step to facilitate construction of a metal structure onto a fabric or other substrate.

As shown in FIG. 10, the second thread 604 may be twisted around the first thread 602. For example, the second thread 604 wraps around the first thread 602. In another example, the second thread 604 helically wraps around the first thread 602. In some embodiments, the first thread 602 remains substantially straight.

Figure 11:
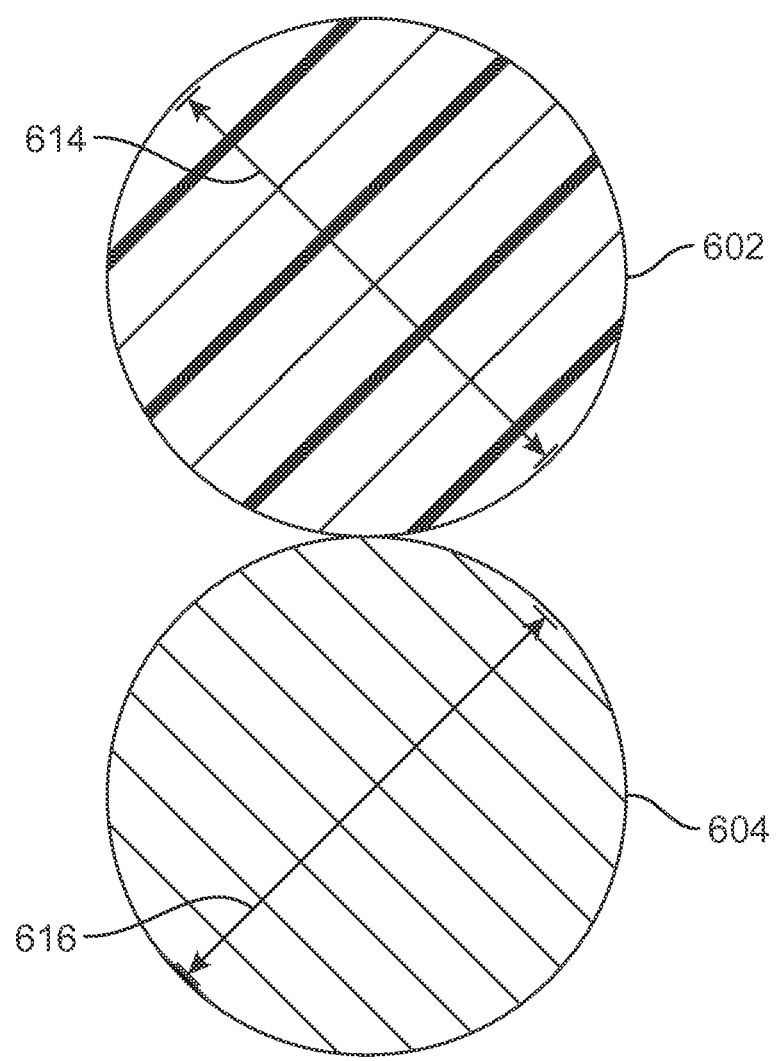
FIG. 11 is a cross-sectional view of a straight thread structure composition of FIG. 10, in accordance with an exemplary embodiment.

In different embodiments, the diameters of two threads could vary in any manner. In some embodiments, the diameters of the two threads could be substantially different. In one embodiment, the first thread 602 has a first diameter equal to a second diameter of the second thread 604. For example, as shown in FIG. 11, the first diameter 614 is substantially equal to the second diameter 616. As used herein, the first diameter 614 is substantially equal to the second diameter 616 when the first diameter 614 and the second diameter 616 have a proportional difference of less than twenty percent.

In some instances, it may be desirable for the first thread to include a core layer and an outer layer. For example, the first thread 602 may include a core layer and an outer layer (not shown). The outer layer may be substantially formed of a heat moldable material. In some embodiments, the core layer is substantially formed of a melt resistant material.

Figure 12:
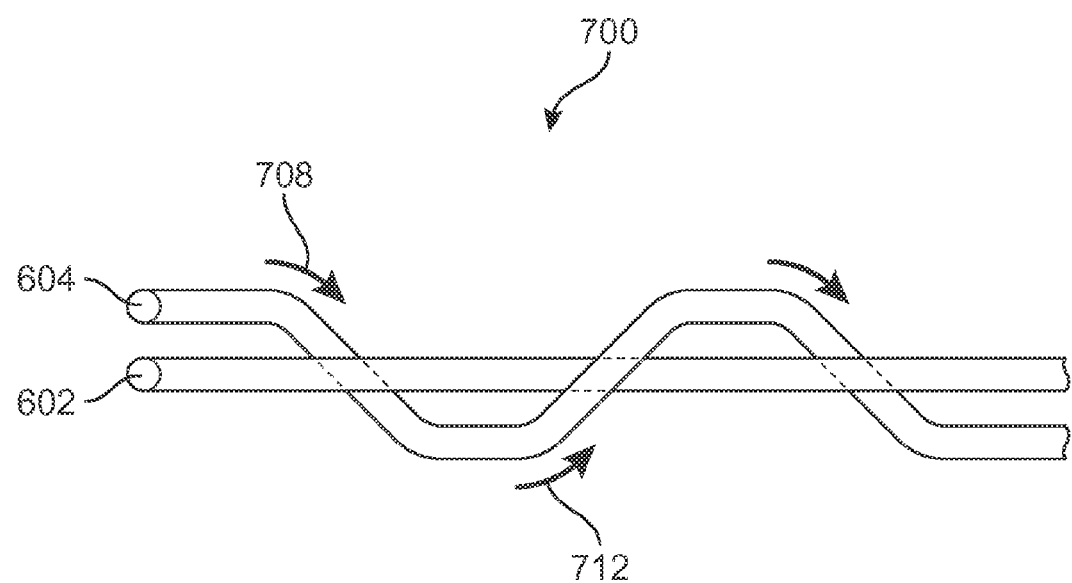
FIG. 12 is a schematic view of a method of making a straight thread structure composition, in accordance with an exemplary embodiment.

FIG. 12 illustrates a method of making a straight thread structure composition. For example, as shown, the first thread 602 is provided and the second thread 604 is provided. For example, the first thread 602 may be provided by pulling the first thread 602 from a reel and the second thread 604 may be provided by pulling the second thread 604 from a reel. As shown in FIG. 12, the method 700 includes twisting the second thread 604 around the first thread 602. For example, a downward twisting force 708 is used to wrap the second thread 604 around the first thread 602. Additionally, an upward twisting force 712 may be utilized to further wrap the second thread 604 around the first thread 602.

Figure 13:
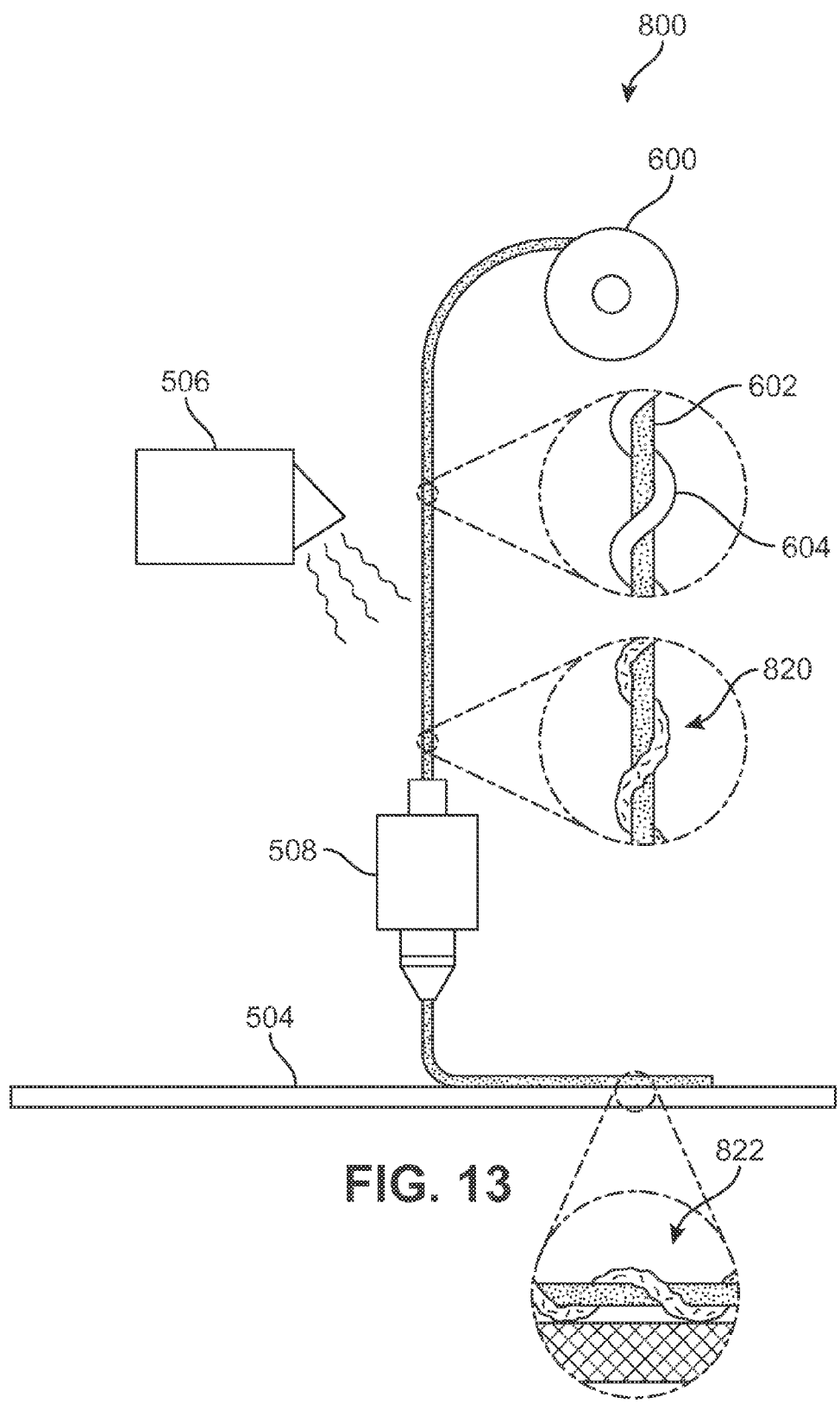
FIG. 13 is a schematic view of a freeform printer configured to print a straight thread structure composition, in accordance with an exemplary embodiment.

FIGS. 13-16 illustrate a system using a straight thread structure composition. As shown in FIG. 13, a system 800 may be substantially similar to system 500 but include a straight thread structure composition 600 instead of thread structure composition 502.

Figure 14:
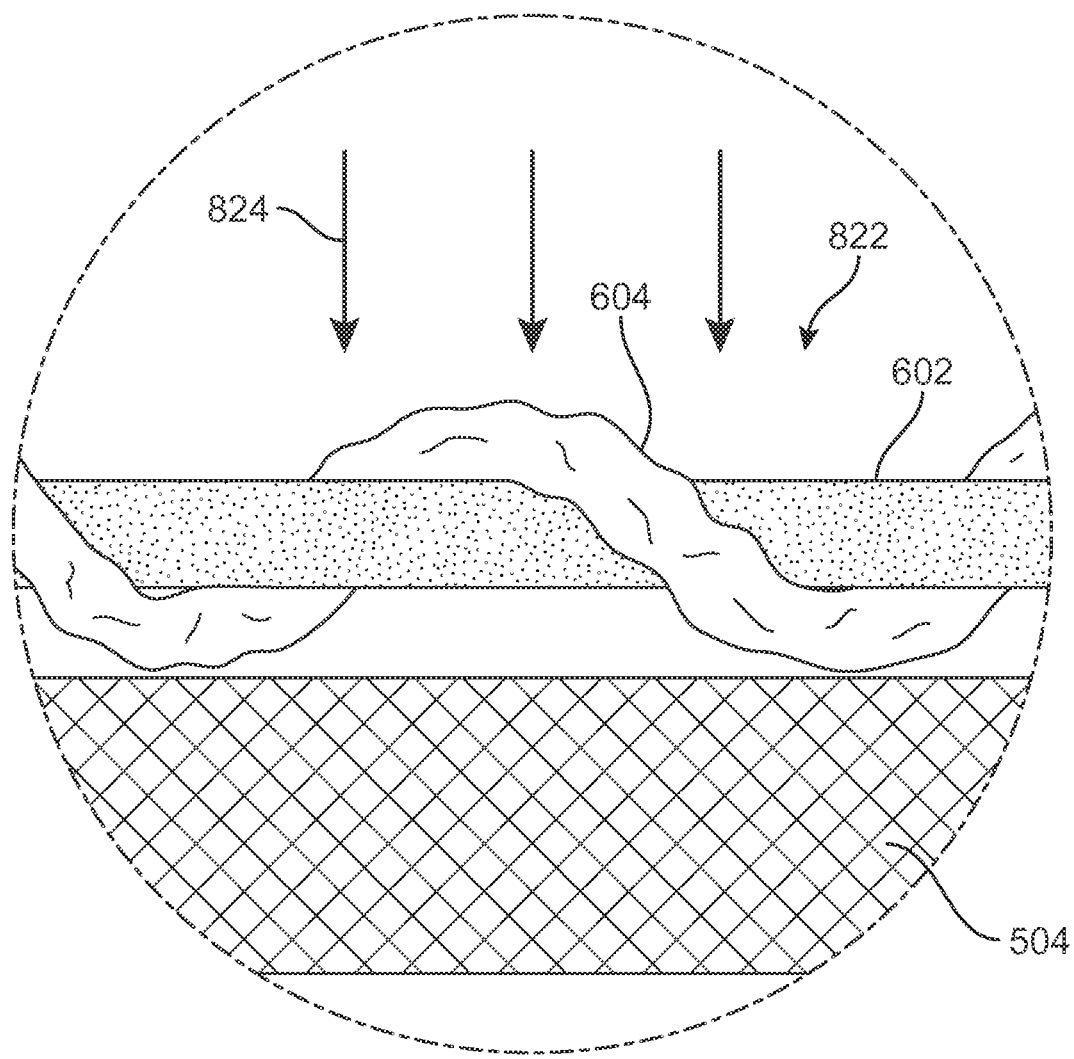
FIG. 14 is a schematic view of a straight thread structure composition after printing, in accordance with an exemplary embodiment.
Figure 15:
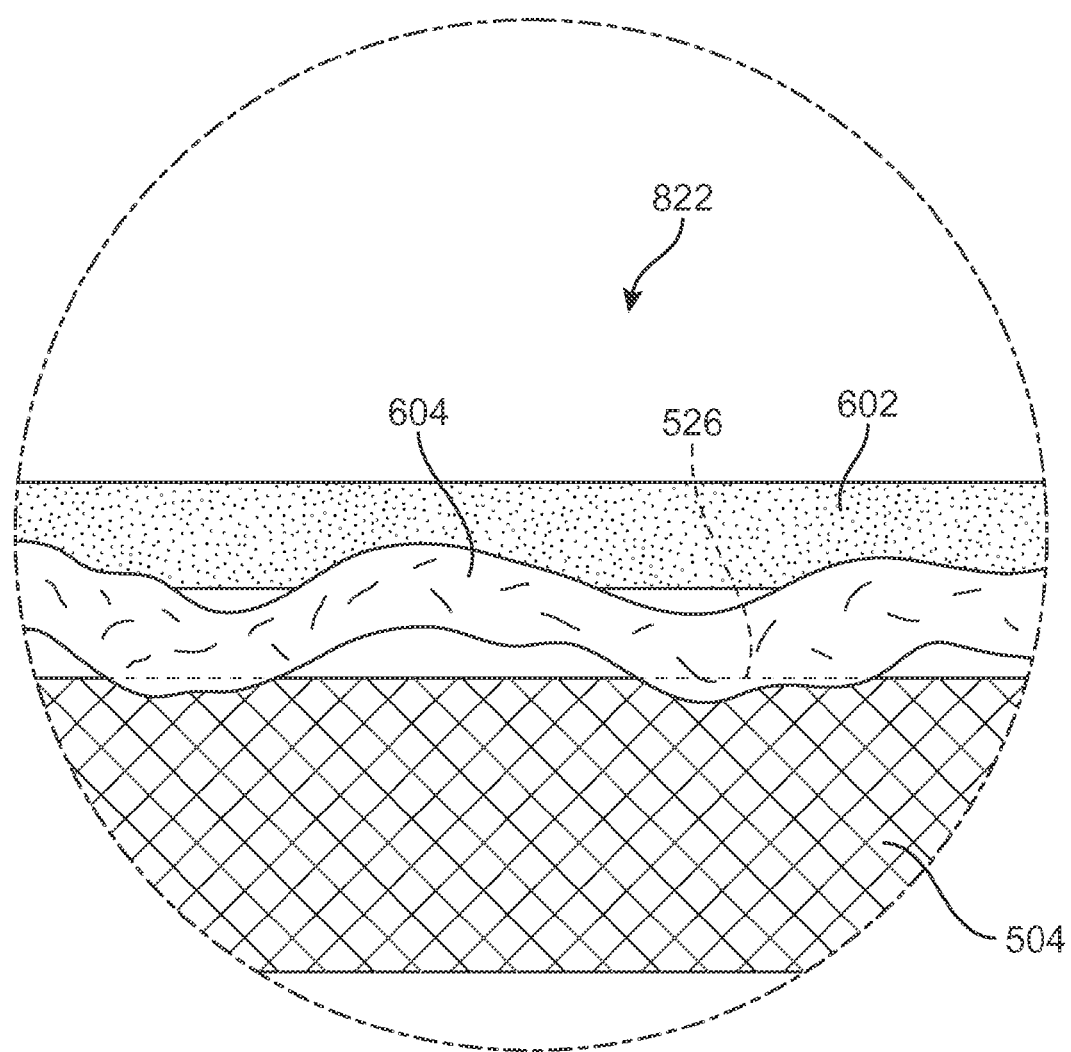
FIG. 15 is a schematic view of a straight thread structure composition during a bonding step, in accordance with an exemplary embodiment.
Figure 16:
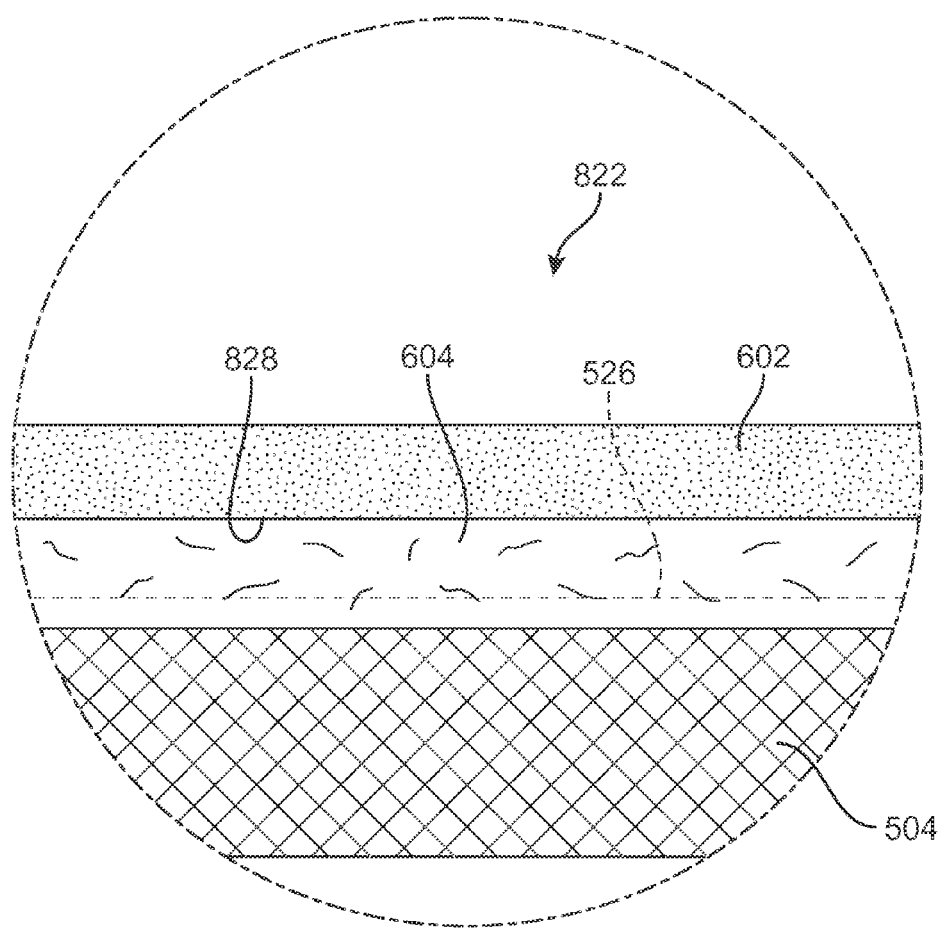
FIG. 16 is a schematic view of a straight thread structure composition after a bonding step, in accordance with an exemplary embodiment.

As shown in FIG. 13, the heat source 506 heats the straight thread structure composition 600 and the extruder 508 extrudes the heated thread structure composition 820. In some embodiments, an extruded thread structure includes a first thread and a second thread. For example, as shown in FIGS. 14-16, the extruded thread structure 822 includes the first thread 602 and the second thread 604.

In some cases, it is desirable for the extruder to extrude at least one thread of the heated straight thread structure composition in a solid state. For example, as shown in FIG. 13, the heated thread structure composition 820 includes a first thread 602 having an elongated shape. As previously noted, an elongated shape has a length that is substantially greater than a width and a thickness. In some embodiments, the first thread 602 is made of a melt resistant material to allow the first thread 602 to be printed in the elongated shape. In one embodiment, the first thread 602 is made of a melt resistant material to allow the first thread 602 to be printed in a solid state.

In some embodiments, it is desirable to bond a heat moldable material of the second thread into the fabric. For example, as shown in FIG. 14, a downward force 824 may be applied to push the extruded thread structure 822 into the fabric 504. Such a downward force may be generated by various means. For example, an actuator system may move the extruder 508 into the fabric 504 to generate the downward force 824. In some instances, a heat moldable material of the second thread permeates into a fabric. For example, as shown in FIG. 15, a thermoplastic of the second thread 604 extends through an outer surface 526 of the fabric 504. In other embodiments, a heat moldable material of the second thread bonds onto a fabric. For example, a thermoplastic of the second thread 604 bonds directly onto the outer surface 526 of the fabric 504 (not shown).

In some instances, it is desirable to bond the first thread to a heat moldable material of the thread structure composition. In some embodiments, a heat moldable material of the second thread bonds directly onto the first thread. For example, as shown in FIG. 16, a thermoplastic of the second thread 604 bonds directly onto the outer surface 828 of the fabric first thread 602. In other embodiments, a heat moldable material of the second thread permeates into the first thread. For example, a thermoplastic of the second thread 604 permeates through the outer surface 828 and into the first thread 602 (not shown).

It will be appreciated that the choice of melt resistant materials for a first thread of a thread structure composition may be made according to various factors. For example, in embodiments where it is desirable to print an intricate thread-pattern onto a fabric, the melt resistant material may be a material known for use in making textiles, such as a cotton thread or other fiber based thread. In still other embodiments, it may be desirable to print a more rigid structure, such as stiff wiring pattern, onto a fabric. In such embodiments, a suitable melt resistant material may be a metal, such as copper. Moreover, it can be appreciated that the patterns of a first thread printed onto a fabric could be decorative in some cases, and may provide functional elements in other cases. For example, it is contemplated that in some embodiments a metal wire could be printed and bonded to a fabric to help reinforce part of the fabric.

While various embodiments have been described, the description is intended to be exemplary, rather than limiting and it will be apparent to those of ordinary skill in the art that many more embodiments and implementations are possible that are within the scope of the embodiments. Accordingly, the various embodiments are not to be restricted except in light of the attached claims and their equivalents. Also, various modifications and changes may be made within the scope of the attached claims.

What is claimed is:

1. A system comprising:
   a thread structure composition comprising:
      a first thread comprising a first material, the first material having a first melting temperature;
      a second thread comprising a second material, the second material having a second melting temperature; and
      wherein the second thread is twisted around the first thread;
   a heat source configured to heat the thread structure composition to a temperature;
      wherein the temperature is less than the first melting temperature;
      wherein the temperature is greater than the second melting temperature;
   an extruder configured to extrude the heated thread structure composition; and
   a fabric for receiving the extruded thread structure composition,
      wherein the fabric has a length, a width, and a thickness;
      wherein a first direction extends along the length;
      wherein a second direction extends along the width;
      wherein a third direction extends along the thickness; and
   wherein the extruder is further configured to move in the first direction, the second direction, and the third direction.

2. The system according to claim 1, wherein the second material is configured to permeate into the fabric.

3. The system according to claim 1, wherein the second material is configured to bond directly onto an outer surface of the first thread.

4. The system according to claim 1, wherein the second material is configured to permeate through an outer surface of the first thread.

5. The system according to claim 1, wherein the second material is thermoplastic.

6. The system according to claim 1, wherein the temperature is approximately 250 degrees Celsius.

7. The system according to claim 1, wherein the first thread has a first diameter substantially equal to a second diameter of the second thread.

8. The system according to claim 1, wherein the second thread includes a core layer and an outer layer, the outer layer being formed of the second material; and
   wherein the core layer is formed of the first material.

9. The system according to claim 1, wherein the first thread includes a core layer and an outer layer, the outer layer being formed of the second material; and
   wherein the core layer is formed of the first material.

10. A method of using a printable thread structure composition, the method comprising:
    providing a printable thread structure composition comprising
       a first thread comprising a first material, wherein the first material has a first melting temperature;
       a second thread comprising a second material, wherein the second material has a second melting temperature;
    heating the printable thread structure composition to a temperature, wherein the temperature is less than the first melting temperature and greater than the second melting temperature;
    extruding the heated printable thread structure composition onto a fabric with an extruder,
       wherein the fabric has a length, a width, and a thickness;
       wherein a first direction extends along the length;
       wherein a second direction extends along the width;
       wherein a third direction extends along the thickness; and
    wherein the step of extruding includes moving the extruder in the first direction, the second direction, and the third direction.

11. The method according to claim 10, wherein the extruder is a component of a freeform printer.

12. The method according to claim 11, wherein the step of heating the printable thread structure composition includes using a heater, wherein the heater is a second component of the freeform printer.

13. The method according to claim 10, wherein the step of providing a printable thread composition includes
providing a first thread comprising a first material;
providing a second thread comprising a second material that is different from the first material;
wherein the second material is moldable above the temperature;
wherein the first material is in a solid state above the temperature; and
twisting the second thread around the first thread to form the thread structure composition.

14. The method according claim 13, wherein the step of twisting the second thread around the first thread helically twists the second thread around the first thread.

15. The method according claim 13, wherein the twisting the second thread around the first thread twists the first thread around the second thread.

16. The method according to claim 10, wherein the first thread is provided with a core layer formed of the first material; and
wherein the first thread is provided with an outer layer formed of the second material.

17. The method according to claim 10, wherein the second thread is provided with a core layer and an outer layer, the outer layer being formed of the second material; and
wherein the core layer is formed of the first material.

18. The method according to claim 10, wherein the temperature is approximately 250 degrees Celsius.

19. The method according to claim 10 further comprising the step of applying a downward force to the heated printable thread structure composition after the step of extruding to push a portion of the heated printable thread structure composition into the fabric.

20. The method according to claim 10, wherein the material of the second thread permeates the fabric after the step of extruding.

\* \* \* \* \*